July 17, 1934.  W. MÖLLER  1,967,156
APPARATUS FOR THE AUTOMATIC CONTROL MORE PARTICULARLY OF AIRCRAFT
Filed Feb. 17, 1934   2 Sheets-Sheet 2

Inventor:
Walmar Möller
by E. H. Palmer
atty.

Patented July 17, 1934

1,967,156

UNITED STATES PATENT OFFICE 1,967,156

APPARATUS FOR THE AUTOMATIC CONTROL MORE PARTICULARLY OF AIRCRAFT

Waldemar Möller, Berlin-Zehlendorf, Germany, assignor to Askania-Werke A. G. vormals Central Werkstatt Dessau, und Carl Bamberg-Friedenau, a German company Application February 17, 1934, Serial No. 711,770
In Germany February 15, 1933

6 Claims. (Cl. 244—29)

This invention relates to apparatus for the automatic control more particularly of aircraft and one of the objects of the invention is to provide improved apparatus for that purpose which shall be effective and reliable under all weather conditions.

Another object of the invention is to provide apparatus for the control more particularly of aircraft wherein the movable part or parts of the controlling means which renders operative and inoperative the power by which the flight controlling means (rudder, elevator or the like) is actuated, is or are anchored in the zero or median position wherein said power is inoperative, by a resilient or tensioning force (spring for example) that is quite independent of all exterior influences.

Other objects of the invention will appear in the course of the following description.

The invention and its aims and objects will be clearly understood from the following description, taken in connection with the accompanying drawings of illustrative apparatus embodying the features of the invention, the true scope of the invention being more particularly pointed out in the appended claims.

Figure 1:
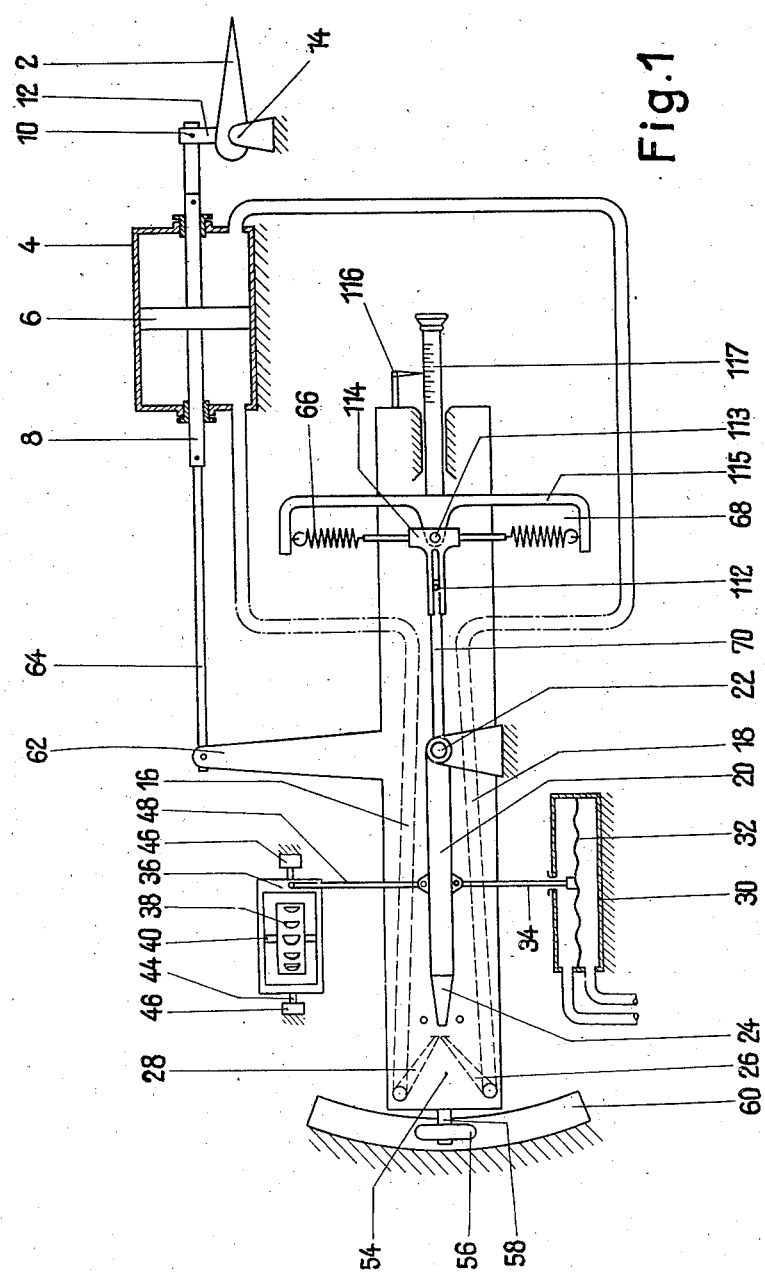
Fig. 1 is a diagrammatic representation of one illustrative embodiment of the invention.

In the illustrative embodiments of the invention herein shown, the invention is illustrated in its application to lateral steering. It will be apparent to those skilled in the art, however, that the invention is equally applicable to vertical and transverse control of the flight of aircraft and to the control of the steering of ships.

Referring to the drawings, flight controlling means, herein specifically a rudder, is shown at 2. Power-operated means for said rudder herein comprises a cylinder 4 having a piston 6, the rod 8 of which has one end pivotally connected at 10 to a lever 12 operatively connected to the rudder 2 which is pivoted at 14. The power operation of the piston 6 will preferably be effected by fluid pressure, compressed air from a compressor or other suitable source of supply (not shown) being herein supplied to opposite ends of the cylinder 4 through pipes 16 and 18 respectively. The supply of said power to said pipes 16 and 18 is controlled by suitable controlling means for example a jet nozzle 20, pivoted for oscillatory movement at its rear end upon a pipe 22 which opens into said jet nozzle and communicates at its other end with said source of compressed air, said jet nozzle being thus continuously supplied with compressed air which issues in a continuous stream from its nozzle end 24. The discharge opening of said nozzle 24 cooperates with two ports 26 and 28 which are situated adjacent each other in the same plane in which said nozzle is adapted to oscillate. When said nozzle 24 occupies its median position relative to said two ports 26 and 28 so that both are sprayed equally with the compressed air issuing from said nozzle, the pressure in the cylinder 4 will be equal upon opposite sides of the piston 6 and the power will be inoperative to actuate said rudder. Said power will become operative however to move said rudder if said jet nozzle be moved clockwise or contraclockwise, viewing Fig. 1, thus supplying the port 28 or the port 26 with more fluid pressure, so that the pressure upon the corresponding side of the piston 6 will be increased, the pressure upon the other side being correspondingly diminished and the rudder moved in the corresponding direction.

Means are herein provided, responsive to deviation of the aircraft from its true course either to starboard or port, to control said jet nozzle 20 and thus exert a corrective action upon said rudder. Herein said means illustratively comprises a diaphragm chamber 30 (referring to Fig. 1) containing a diaphragm 32 connected by a suitable link system 34 with said jet nozzle 20. Said diaphragm 32 will be operated and controlled by fluid pressure from any suitable means such for example as a compressed air steering indicator compass as described in my Patent No. 1,900,516 for example to which reference may be had for a more detailed description of said apparatus. As will be readily understood, if the aircraft deviates to starboard or port from the course for which the course indicator compass is adjusted, one or the other of the diaphragm chambers will receive more pressure through the pipe which supplies the pressure thereto, so that said diaphragm being displaced in one direction or the other will swing said jet nozzle either clockwise or contraclockwise relative to said two ports 26 and 28, thus supplying one with more pressure than the other and correspondingly moving the rudder through the action of piston 6.

Means may also be provided for exerting upon the rudder or other flight-controlling means a corrective action or force derived from the speed of the turning movement of the aircraft. Any suitable means may be provided for this purpose, that herein illustratively selected comprising a gyroscope 36 having its rotor 38 upon a shaft 40 mounted in a frame 42 having its precessional axis 44 mounted in bearings 46, 46. Said frame 42 is suitably connected by a link and lever system 48, with said jet nozzle 20. When the aircraft turns said gyroscope will precess about said precessional axis, thus tending to move said jet nozzle 20 to supply more fluid pressure to the one or the other of said ports 26 and 28, as the case may be, thus exerting a further corrective action upon said rudder, as will be readily understood.

In order to secure still greater stabilization, the present invention contemplates the provision of improved means whereby the zero position of the controlling means which renders operative and inoperative the power by which the flight controlling means is actuated, is changed in correspondence with the movements or strokes of the flight controlling means (rudder or the like). Such means is generally designated as "restoring means". Referring to Fig. 1, in the improved embodiment of said restoring means therein illustrated the block or plate 54 provided with the ports 26 and 28 is mounted for swinging movement about the axis of the pipe 22 about which said jet nozzle 20 is adapted to oscillate. For greater stability a roll 56 may be mounted upon a shaft 58 projecting from the front end of said block 54, said roll being adapted to roll upon a track 60. At its right end, viewing Fig. 1, said block 54 is provided with a lateral boss 62 pivotally connected by a link 64 with the piston rod 8. If in operation, the jet nozzle 24 be swung contra-clockwise, viewing Fig. 1, thus increasing the fluid pressure in the port 26 and at the right of the piston 6 of the cylinder 4, the pressure to the left of said piston consequently diminishing, said piston will move to the left, thus swinging the rudder 2 to starboard. This causes the piston rod 8 to swing the block 54 contra-clockwise about its fulcrum 22, thus causing the ports 26 and 28 to execute a follow-up movement relative to the nozzle 24. This is generally known as the so-called position restoring. Heretofore, however, the jet nozzle 24 or other relatively movable part of the power controlling means was freely movable relative to the other part of said power controlling means; in accordance with the present invention said jet nozzle or other movable part is resiliently anchored to the part to be restored, herein specifically to said block 54, and this in its median position relative to the ports 26 and 28, so that both the latter will be equally hit by the fluid pressure issuing from the nozzle 24.—In my invention I am using two springs 68 and 66 which are acting into opposite sides of the lever mechanism 114. The jet pipe lever 20 carries at its end a pin 112 which moves between the two legs of fork 114. This fork turns around the pin at 113 and is mounted again into the slider bracket 115. The position of this slider relative to the base 62 is shown by the indicator 116.

For any deviation of the jet pipe a movement of lever 70 will result in a counteracting momentum unto the jet pipe. This momentum will vary with the degree of deviation from the neutral position and with different position of slider 117. Moving 117 for instance in the direction of the jet nozzle (inward) will increase this restoring momentum and vice versa if the slider is pulled out.

The adjustment of this slider with its spring mechanism therefore and this is the very scope of my invention permits without interruption of the control to change the sensitivity of the relay mechanism to meet the particular regulating problem. It is therefore possible to obtain any desired characteristic of sensitivity regardless of the sensitivity proper of the various systems (diaphragms, gyroscopes, etc.). This is especially desirable as different aircrafts usually call for different sensitivity of the control relay.

It is evident that the invention is by no means restricted to the use of the jet pipe relay but that any electrical—hydraulical or mechanical relay may be used with the same advantage. I am also aware of the fact that the adjustability of sensitivity of any type of relay is not limited by any means to this particular aircraft control problem which I have chosen for illustration but can also be used in combination with controls of pressure—temperature or any other measurable condition.

Figure 2:
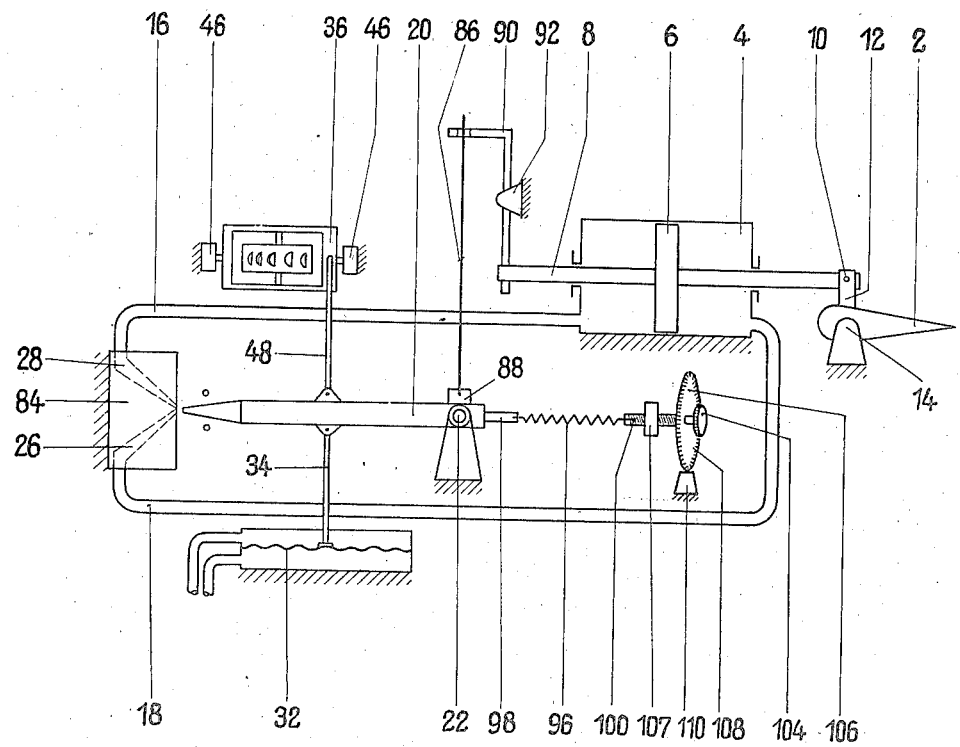
Fig. 2 shows, also in part diagrammatically, another illustrative embodiment of the invention.

Referring to Fig. 2, the illustrative embodiment of the invention therein shown discloses a power-operated restoring device. As distinguished from the device shown in Fig. 1, the median position of the power-controlling means in Fig. 2 is varied by the action upon said controlling device of an adjustable one-sided force derived from movement of the rudder or other flight controlling means. As a result the controlling actions upon the jet nozzle 20 or other power-controlling means must exert upon said power-controlling means a certain counter force which shall neutralize the adjusted return force, in order that said power-controlling means may return to its median position.

In this embodiment of the invention the ports 26 and 28 are provided in an immovable block or plate 84, and the return movement of the power-adjusting means is effected by the action upon the jet nozzle 20 of a variable force which tends to swing said nozzle in the one or the other direction, said force being derived by displacement of the rudder operating means and being variable with displacement of the piston 2, in the present instance, from its median position, that is to say with deviation of the rudder from its median position relative to the aircraft. In the illustrative embodiment of the invention, resilient means is used for this purpose, herein a leaf spring 86, affixed at its lower end to a boss 88 at the center of oscillation of said nozzle 20 and having its upper end in engagement with an arm 90 fulcrumed at 92 and pivotally connected at 94 to the left end of the piston rod 8. If said nozzle 20 be turned, for example, in a contra-clockwise direction, so that the port 26 shall receive more fluid pressure, thus moving the piston 6 to the left and swinging the rudder 2 to starboard, then and in that case said spring 86 will be tensioned in such manner that it tends to return said nozzle 20 to its median position relative to said two ports 26 and 28. The same return action as that obtained by the embodiment of Fig. 1 is thus obtained but as distinguished from the arrangement in Fig. 1, the median position of said nozzle 20 remains invariable relative to the immovable parts of the power-controlling means. In accordance with the invention, said nozzle 20, in the embodiment of the invention shown in Fig. 2, is also anchored by a resilient connection, namely, herein a spring 96 to the immovable parts of said power-controlling means. Preferably said spring anchoring will be effected by connecting one end of said spring 96 to the rear end of said nozzle 20 beyond its point of oscillation at 98 for example, the other end of said spring 96 being connected to a screw 100 having screw threaded connection with a fixed nut 102 and provided conveniently with a knurled head 104. A disk 106 may be fixed to said screw 100 and said disk may be provided with a scale 108 to cooperate with a fixed index 110. In this case, also, therefore, the strength of the anchorage can be adjusted to the best advantage by tests during the flight and by means of the screw 100 and the best adjustment noted by the scale and index 108, 110.

As distinguished from return devices heretofore used, in which the spring cooperates with an oil brake connected to the return part and serves, in conjunction with said oil brake, to retard the return movement in the case of considerable rudder movements, so as to prevent pendulating action in the case of large ships, the anchorage in accordance with applicant's invention, of the relatively movable parts of the power-controlling means to the relative median position thereof, has nothing to do with the return action, but serves for regulating the sensitivity of the flight or steering control. It will be perfectly obvious that the flight control will be all the more sensitive, the more readily the parts of the power-controlling means are movable relative to each other and furthermore that hypersensitivity of the flight or steering control would injuriously affect the stability of the aircraft and would be likely to produce pendulating about the median position particularly in squally weather. If, however, the relatively movable parts of the power-adjusting means are anchored to the relatively median position by a tensional force, then the sensitivity can obviously be reduced as desired by increasing the stiffness of the anchoring spring means.

I am aware that my invention may be embodied in other specific forms without departing from the spirit or essential attributes thereof; and I therefore desire the present embodiments to be considered in all respects as illustrative and not restrictive, reference being had to the appended claims rather than to the foregoing description to indicate the scope of the invention.

I claim:

1. Apparatus for the automatic control of aircraft having, in combination, flight controlling means; power-operated actuating mechanism therefor; controlling means comprising a member movable, responsive to deviatory movements of the aircraft, from a position to render said mechanism inoperative to a position to render said mechanism operative; means tending automatically to return said movable member to inoperative position; and resilient means anchoring said member to its inoperative position.

2. Apparatus for the automatic control of aircraft having, in combination, flight controlling means; power-operated actuating mechanism therefor; controlling means comprising a member movable, responsive to deviatory movements of the aircraft, from a position to render said mechanism inoperative to a position to render said mechanism operative; means tending automatically to return said movable member to inoperative position; resilient means anchoring said member to said inoperative position; and means to adjust the tension of said resilient means.

3. Apparatus for the automatic control of aircraft having, in combination, flight controlling means; power-operated actuating mechanism therefor; controlling means comprising a member movable, responsive to deviatory movements of the aircraft, from a position to render said mechanism inoperative to a position to render said mechanism operative; means comprising a resilient member tending automatically to return said movable member to inoperative position; and resilient means anchoring said movable member to its inoperative position.

4. Apparatus for the automatic control of aircraft having, in combination, flight controlling means; power-operated actuating mechanism therefor; controlling means comprising a member movable, responsive to deviatory movements of the aircraft, from a position to render said mechanism inoperative to a position to render said mechanism operative; means comprising a resilient member tending automatically to return said movable member to inoperative position; resilient means anchoring said movable member to its inoperative position; and means to adjust the tension of said resilient means.

5. Apparatus for the automatic control of aircraft having, in combination, flight controlling means; power-operated actuating mechanism therefor; controlling means comprising two members relatively movable, responsive to deviatory movements of the aircraft, from a position to render said mechanism inoperative to a position to render said mechanism operative; means tending automatically relatively to move said members to inoperative position; and resilient means anchoring said members relative to each other in inoperative position.

6. Apparatus for the automatic control of aircraft having, in combination, flight controlling means; power-operated actuating mechanism therefor; controlling means comprising two members relatively movable responsive to deviatory movements of the aircraft, from position to render said mechanism inoperative to position to render said mechanism operative; means tending automatically relatively to move said members to inoperative position; resilient means anchoring said members relative to each other in inoperative position; and means to adjust the tension of said resilient means.

WALDEMAR MÖLLER.